United States Patent

Bianco

[11] Patent Number: 5,230,277
[45] Date of Patent: Jul. 27, 1993

[54] DEVICE FOR MAKING COFFEE
[75] Inventor: Carlo Bianco, Milan, Italy
[73] Assignee: Ricerca Elettromeccanica S.R.L., Milan, Italy
[21] Appl. No.: 765,907
[22] Filed: Sep. 24, 1991
[30] Foreign Application Priority Data Jan. 25, 1991 [IT] Italy ............................ 000065/91[U]

[51] Int. Cl.5 .................... A47J 31/36; A47J 31/44
[52] U.S. Cl. ................... 99/287; 99/289 R; 99/302 R; 99/302 P
[58] Field of Search ............ 99/279, 289 R, 289 P, 99/291, 297, 302 R, 302 D, 287, 292

[56] References Cited

U.S. PATENT DOCUMENTS

| 3,760,712 | 9/1973 | Rossi | 99/289 R |
|---|---|---|---|
| 4,188,863 | 2/1980 | Grossi | 99/289 R |
| 4,457,216 | 7/1984 | Dremmel | 99/289 R |
| 4,491,063 | 1/1985 | Grossi | 99/289 R |
| 4,583,450 | 4/1986 | Rost et al. | 99/279 |
| 4,796,521 | 1/1989 | Grossi | 99/289 R |
| 4,797,296 | 1/1989 | Meier et al. | 99/289 R |
| 4,852,472 | 8/1989 | In-Albon et al. | 99/289 R |
| 4,934,258 | 6/1990 | Versini | 99/289 R |
| 5,134,925 | 8/1992 | Bunn et al. | 99/289 R |

FOREIGN PATENT DOCUMENTS

| 2053466 | 5/1971 | Fed. Rep. of Germany | 99/289 R |
|---|---|---|---|
| 2648033 | 12/1990 | France | 99/289 R |

Primary Examiner—Harvey C. Hornsby
Assistant Examiner—Tony G. Soohoo
Attorney, Agent, or Firm—Notaro & Michalos

[57] ABSTRACT

A machine for making coffee has a cylindrical chamber in which the head walls are made up of two pistons mounted on circulating ball screw actuators. Once the coffee powder is put into the chamber, the pistons are brought together to exert pressure, after which hot water is introduced to make the infusion. A motor for one of the actuators is in a lower casing on which the chamber is directly mounted for compact construction.

4 Claims, 2 Drawing Sheets

DEVICE FOR MAKING COFFEE

FIELD AND BACKGROUND OF THE INVENTION

This invention proposes a device for making coffee, comprising a cylindrical chamber whose head walls have a number of pistons mounted on linear actuators of the screw and/or circulating ball type.

The walls of the pistons are made up of the same number of filters which allow the passage of hot water to obtain the infusion.

The new invention is characterized by a particular configuration of parts which forms a smaller overall unit, costs less, and is thus suited to applications in vehicles or for domestic use etc..

Machines are well-known for making coffee which have a chamber with a pair of moving walls worked hydraulically, and which have ducts for the conduction of hot water and for the removal of the coffee infusion.

A measured amount of powdered coffee is introduced into the chamber and is then pressed by the moving walls followed by extraction.

Because of the hydrualic mechanism for moving the walls these machines are mechanically quite complicated and consequently bulky and expensive. They are thus suited to high rates of output which limits their application to places such as canteens, factories or anywhere where there is a high rate of consumption.

Other machines of the type described above are also common, in which the chamber where extraction takes place has at least one moving wall which is activated by electromechanical devices comprising a motor and a transformer which works a mechsnism of cams and rods or the like, for compression of the powder.

These machines, though less expensive than the preceding ones, present greater problems in that their lifespan is limited, and they are in any case still quite bulky.

SUMMARY OF THE INVENTION

It is in this context, then, that the current invention is set, proposing a device for making coffee comprising a chamber which is basically cylindrical with moving head walls, connected to a system for the conduction and emptying of a liquid, in which the movements of said walls take place by way of a linear screw and/or circulating ball actuator.

This allows the unit to be very compact and economical and especially suited to applications in buses or vehicles in general, and for home use.

BRIEF DESCRIPTION OF THE INVENTION

The current invention will now be described in detail to give a general example, with particular reference to the enclosed drawings where:

DESCRIPTION OF THE PREFERRED EMBODIMENT

Figure 1:
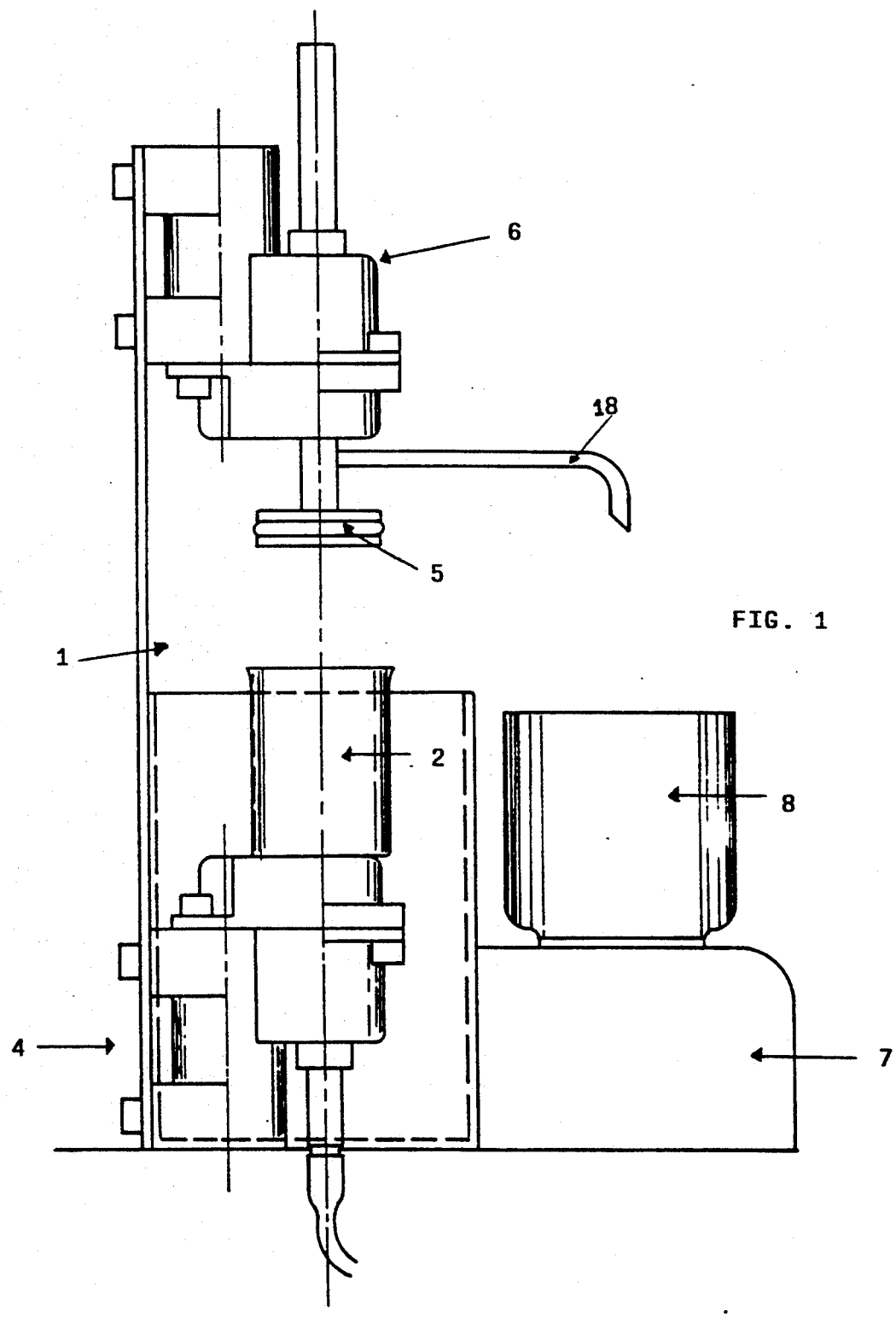
FIG. 1 is a lateral view of a device as per the invention.
Figure 2:
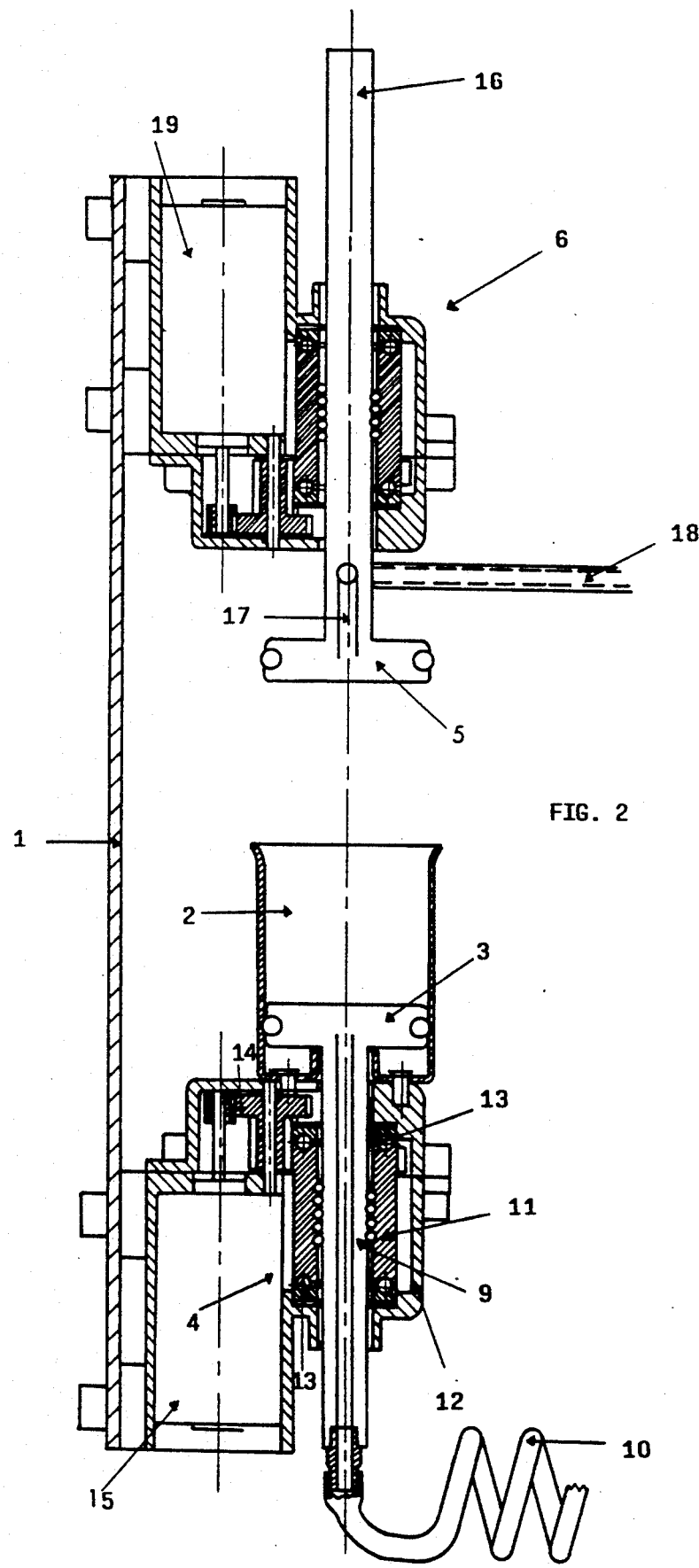
FIG. 2 is a vertical section of the device in FIG. 1.

With reference to FIG. 1 the invention consists of a support (1) on which a unit is mounted made up of a receptacle cylindrical (2) into which a first piston (3) runs (FIG. 2) worked by an actuator indicated overall by the number 4 and in the upper part a second, upper piston (5) worked by a second actuator the same as the first, indicated overall as number 6.

At the side of the actuator unit (4) is a base or support (7) for a container (8) which receives the coffee infusion. The piston (3) forms a unit with a shaft (9), being hollow and connected through a flexible tube (10) to a hot water supply which is not illustrated in the drawing and is not described, not being part of the invention.

The external part of the shaft (9) is threaded to form the shaft of a linear screw and/or circulating ball actuator, the body of which (11) is mounted in a casing (12) of the actuator by thrust bearings (13). Body 11 has internal threads which cooperate with the external threads of shaft 9 to cause linear movement of shaft 9 when body 11 rotates.

The body (11) has external teeth engaged into the corresponding teething of a gear reducer (14) which is activated by an electric motor (15) or the like.

Similarly, the upper piston shaft (16) is part of the linear screw and/or circulating ball actuator, as described previously.

The shaft also has a section of a small channel (17) directed towards a duct (18) for emptying the coffee infusion into the receptable (8).

The machine is then completed by other devices which are not illustrated in that they are already well-known, such as end of run microswitches for the pistons (3 and 5), devices for putting a measured amount of coffee powder into the receptacle (2) and for heating and pumping the water. The invention functions as follows.

The device is set in motion, for example by bringing the water up to the required temperature, and the powdered coffee is put into the recipient (2), either measured out separately or in filter bags or by similar means.

The control devices then activate the motors (15 and 19) which, through their reducers, activate the actuators (4 and 6) and cause pistons shafts (9 and 16) to move along their axes.

The piston (5) is introduced into the receptacle (2) while the lower piston (3) is pushed upwards to compress the coffee powder between the two filter walls of the pistons.

At this point a predetermined quantity of water heated to the required temperature enters the chamber along the duct (10) and the shaft (9).

The hot water passes through the powdered coffee and the infusion comes out along the passage (17) and the duct (18) to be collected in the cup (8).

The piston (5) can now be raised to free access to the container (2) for the withdrawal of the used coffee powder and to start another cycle.

If required, the machine management program may also include raising the piston to the upper edge of the container (2), to facilitate cleaning and removal of the used coffee. With the configuration described considerable advantages are derived, in that the use of linear screw and/or circulating ball actuators means that cost and size of the machine can be greatly reduced.

These actuators can in fact be run with low-powered motors which are economical and small thus producing a small overall actuator. This leads to cost advantages even for machines used infrequently or for domestic use.

Obviously the dimensions as well as the materials used may vary depending on the use to which the machine is put.

I claim:

1. A device for making coffee, comprising:

a support (1);

a first casing (12) mounted to said support;

a linear actuator body (11) mounted for rotation in said first casing, said body carrying external teeth and an internal thread;

a cylindrical receptacle (2) having an open upper end and fixed directly to an upper end of said first casing, and defining a cylindrical space for containing a powdered coffee;

a lower piston (3) mounted for sliding movement upwardly and downwardly in said cylindrical receptacle;

a lower piston shaft (9) fixed to said lower piston and extending through said first casing and into said body for linear movement with respect to said first casing, said lower piston shaft having an external thread operatively engaged with the internal thread of said body for linear movement of said shaft with rotation of said body in said first casing, said lower piston shaft being sufficiently long so that said lower piston is movable to said open upper end of said cylindrical receptacle for moving any powdered coffee in said cylindrical receptacle to said open upper end of said cylindrical receptacle for removal of the powdered coffee;

a first motor (15) mounted in said first casing;

a first gear reduction (14) connected between said first motor and said external teeth of said body, for rotation of said body with activation of said first motor to move said shaft linearly to raise and lower said lower piston in said cylindrical receptacle;

means for supplying hot water through said lower piston shaft and lower piston, and into said cylindrical receptacle;

a second casing fixed to said support above said first casing;

an upper piston (5) mounted for linear movement to said second casing for movement into the open upper end of said cylindrical receptacle, said upper piston including a channel (17) for receiving coffee infused water from said cylindrical receptacle; and upper linear actuator means connected between said second casing and said upper piston for linearly moving said upper piston into and out of said cylindrical receptacle, said upper linear actuator means comprising a second body rotatably mounted in said second casing, a second motor (19) in said second casing and a second gear reducer engaged between said second motor and said second body for rotating said second body, said second body being operatively engaged with said upper piston for converting rotation of said second body to linear motion of said upper piston.

2. A device according to claim 1, including circulating balls between the internal thread of said body and the external thread of said shaft, for converting rotational movement of said body into linear movement of said shaft.

3. A device according to claim 2, wherein said means for supplying hot water comprises said shaft being hollow and a flexible tube (10) connected to a lower end of said shaft for conveying hot water through said shaft.

4. A device according to claim 3, including an upper piston shaft (16) connected to said upper piston, said channel extending into said upper piston, and a duct (18) connected to said channel for receiving coffee infused water from said channel, said device including a base (7) mounted to said support adjacent said first casing, for receiving a container (8) thereon at a location for receiving coffee infused water from said duct.

* * * * *